No. 642,326. Patented Jan. 30, 1900.
H. A. HEATH.
MECHANICAL ILLUSTRATOR OF THE EYE.
(Application filed July 6, 1899.)
(No Model.) 2 Sheets—Sheet 1.
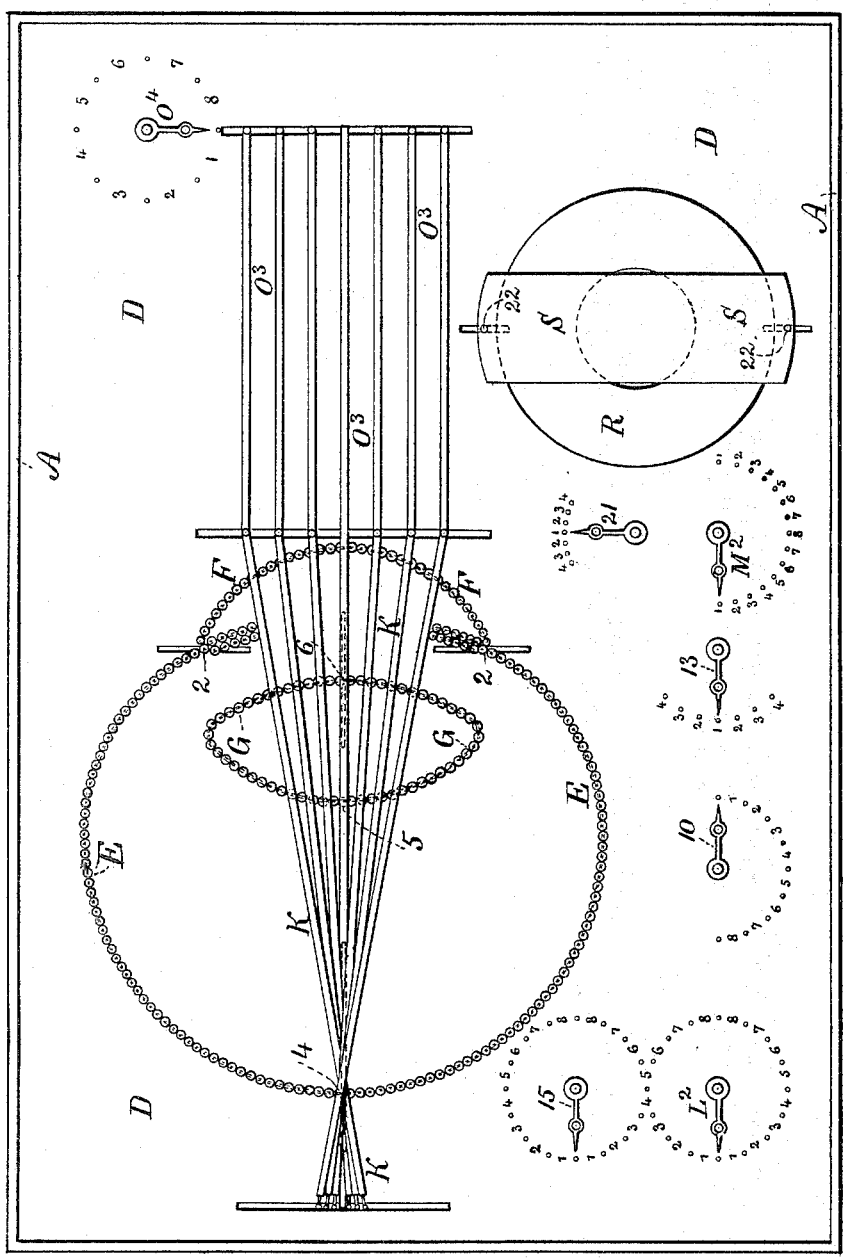

No. 642,326. Patented Jan. 30, 1900.
H. A. HEATH.
MECHANICAL ILLUSTRATOR OF THE EYE.
(Application filed July 6, 1899.)
(No Model.) 2 Sheets—Sheet 2.
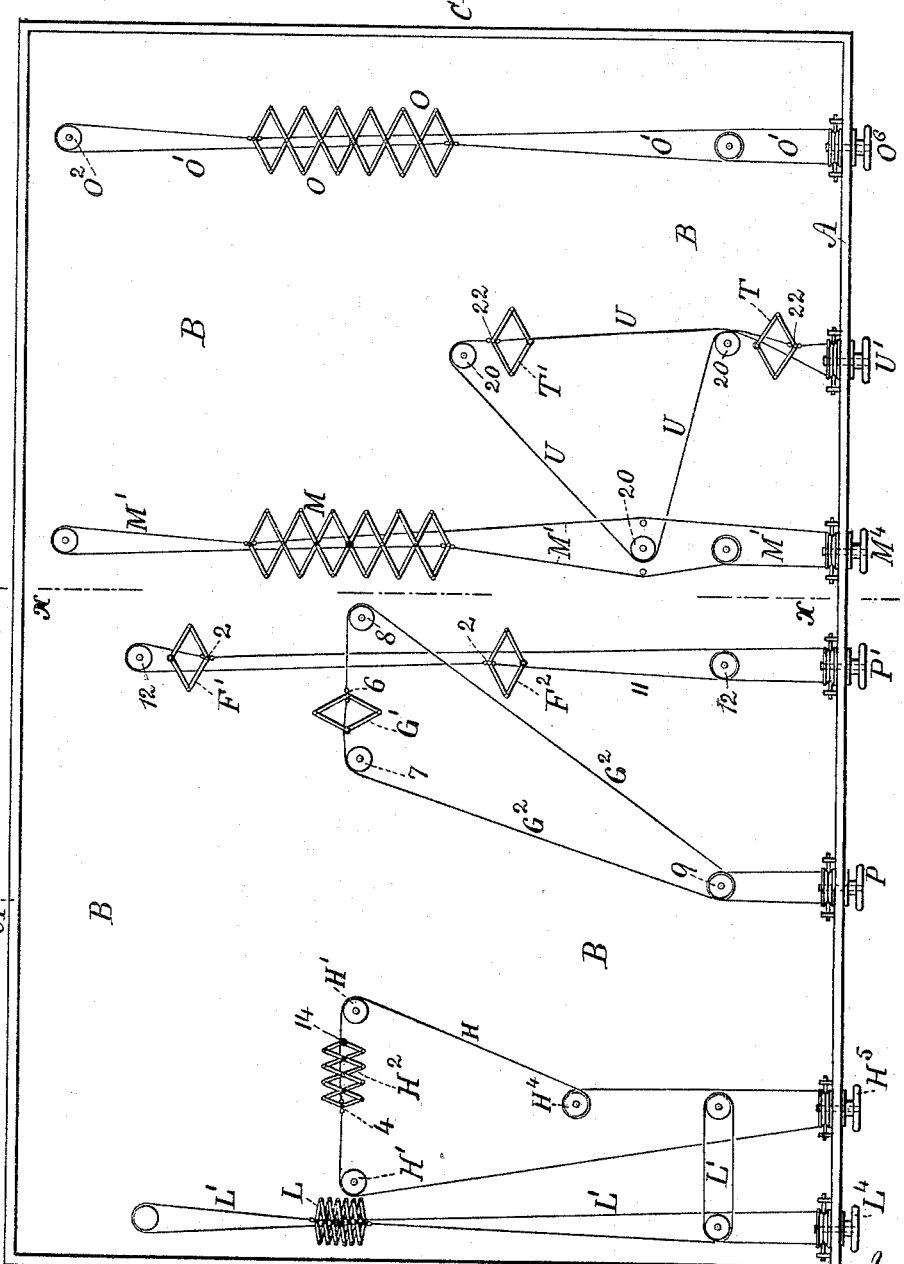

UNITED STATES PATENT OFFICE.

HENRY A. HEATH, OF JERSEY CITY, NEW JERSEY, ASSIGNOR TO BENJAMIN F. STEPHENS, OF NEW YORK, N. Y.

MECHANICAL ILLUSTRATOR OF THE EYE.

SPECIFICATION forming part of Letters Patent No. 642,326, dated January 30, 1900.

Application filed July 6, 1899. Serial No. 722,937. (No model.)

*To all whom it may concern:*

Be it known that I, HENRY A. HEATH, a citizen of the United States, residing at Jersey City, in the county of Hudson and State of New Jersey, have invented a new Mechanical Illustrator of the Eye, of which the following is a specification.

In giving instruction concerning the treatment of the eye and the defects of the same it is often difficult to clearly illustrate, especially to those who are not familiar with the eye, the difficulties that arise and which the optician has to contend against or counteract. In the present apparatus there is an illustration of the eye in section, and provision is made for varying the distance between the front and the back of the eye-model, and there is a representation of the cornea and of the lens, and these are fitted so as to vary their convexity. There are also bars or wires to illustrate the rays of light passing into the eye, and these are connected to a lazy-tongs in front of the cornea, so that the space occupied by the bars or wires that illustrate the light-rays can be varied, and the back ends of these ray-bars are also connected with a lazy-tongs, so that they can be spread or contracted to illustrate that the focus of the ray-bars can coincide with the retina, and these ray-bars are continued outside the eye representation to a third lazy-tongs, so that the bars illustrating the rays outside the eye can be brought parallel to each other or they can be made to converge to illustrate the concentration of the vision upon an object comparatively near the eye. A device is provided for giving greater or less convexity to the portion of the device that represents the cornea and also to the rear portion of the circle illustrating the eyeball, so as to bring the illustration into the desired true circular position or into a more or less elliptical shape, and I also provide on this mechanical illustrator means for representing the convexity of the cornea in relation to the pupil or iris of the eye, and thereby for illustrating astigmatism which may exist in the eye.

In the drawings, Figure 1 is an illustration of the apparatus as it is ordinarily visible. Fig. 2 shows the parts as divested of the background, so as to show the devices employed for moving the respective portions of the apparatus; and Fig. 3 is a cross-section at about the line $x$ $x$.

I find it advantageous to employ a rectangular frame A, with a base at B, upon which the operative parts are mounted, and it is usually advantageous to employ a glass at C as a protection to the illustrator, and the background D of the illustrator intervenes between the back B and the glass C, and in this are openings adapted to the stems of the parts that pass through slots to the operative mechanism and have upon their outer faces the indicating devices hereinafter described. This background may be of any desired material; but it is advantageous to employ velvet or similar material as a covering to the background and simply to slit this flexible material for the passage of the moving devices hereinafter described.

The eyeball-outline E is preferably made of a flexible wire, upon which are strung beads, of any suitable material, that should be of a contrasting color to the background D, and it is advantageous to employ a wire of spring-steel, so that it may be moved at its ends and middle portion to vary the shape of the eyeball-outline, and this eyeball-outline is advantageously continued or connected with the cornea-outline F, the same being made of wire and beads or similar material threaded upon the same, so as to render the outline visible against the background D.

The studs 2 2 are connected at the junction of the cornea and the eyeball, and these are movable, as hereinafter described, so as to vary the convexity of the cornea, and the adjusting-stud 4 is connected to the eyeball-outline in the middle of the back portion, so that by adjusting this stud 4 horizontally the distance between the cornea and the back of the eyeball illustration may be varied to give to the eyeball-outline E a circular form or an elliptical form, with the longest diameter either vertical or horizontal. I prefer and use lazy-tongs, as hereinafter described, for giving these motions to the respective parts.

I provide an illustration of the crystalline lens at G, the same being preferably of colored beads threaded upon the wire and attached firmly at 5 and provided with a movable stud 6, by which the convexity of the crystalline lens may be varied, such stud 6 being moved away from the stationary attachment 5 to increase the convexity of such crystalline-lens illustration or moved toward the said attachment 5 to illustrate a flatter lens. I find it advantageous to employ a lazy-tongs G', connected with the movable stud 6, and a cord G², passing around pulleys 7, 8, and 9, for giving motion to the lazy-tongs G', and upon the axis of the pulley 9 is a hand 10 over a dial to indicate the extent of convexity of the crystalline-lens illustration according to the position of the hand 10 over the dial that surrounds the axis of the pulley 9.

The adjusting-studs 2 2 are provided, respectively, with the lazy-tongs F' and F², and the cord 11, passing over the pulleys 12, is made use of for moving the two studs 2 2 simultaneously either in one direction or the other, and the lower pulley 12 has a hand 13 upon its arbor, so as to indicate upon the dial the extent of motion that is given to the studs 2 2, respectively, for increasing or lessening the convexity of the cornea illustration.

The band H, passing around the pulleys H', is a convenient means for giving motion to the stud 4, and the lazy-tongs H², extending to the stationary stud 14, forms a convenient means for moving the stud 4 and varying the shape of the eyeball illustration E.

I find it a convenient way to connect with the pulley H⁴ a hand 15 and to provide the dial upon the background D to indicate the position of the retina of the eye and the motion that may be given to this portion of the eyeball representation in varying the distance between the retina and the crystalline-lens illustration.

The cords, wires, or strips K, that indicate the rays of light passing into the eye, are connected at the back end with the lazy-tongs L and at the front end to the lazy-tongs M, and these ray-bars cross each other. The bar that is connected to the lazy-tongs L at the bottom passes across and is connected to the lazy-tongs M at the top, and the intermediate ray-bars are connected to the lazy-tongs in succession, so that such ray-bars cross each other at a focal point, and that focal point is changed toward the front or toward the back by opening or closing the back lazy-tongs L, and the front lazy-tongs M may also be spread or closed according to the desired illustration. These lazy-tongs L and M may be moved by any convenient devices. I have represented cords from the respective ends of the lazy-tongs passing to dials, the cords L' passing from the ends of the rear lazy-tongs to the pulley of the focal dial L² and the cords M' from the front lazy-tongs M passing to a dial M². Hence by adjusting these dials L² and M² the lazy-tongs can be spread or drawn together and the ray-bars K brought to the desired position for the purposes of illustration.

It is to be understood that the crossing-point or focus of the ray-bars should be upon the retina substantially at the point 4 where the bars cross; but the lazy-tongs L can be either spread or contracted to bring the crossing-point or focus for the ray-bars either in front of the retina or behind it for indicating the manner in which the rays of light passing to the eye are properly focused on the retina or that the eye is not in perfect condition where the rays of light focus either in front of the retina or behind the retina, which is the case where the image on the retina is not perfect. This improvement can be made use of to indicate astigmatism in the eye where some rays properly focus on the retina and others focus either in front or behind the retina in consequence of imperfections in the cornea or the crystalline lens. This enables the party exhibiting the apparatus or lecturing upon the eye to illustrate the difficulties which arise in consequence of the rays not focusing perfectly upon the retina.

Rays of light passing to the eye are generally parallel, or nearly so, and to illustrate this I make use of lazy-tongs bars at O and cords or similar devices stretching from the intersections of the lazy-tongs bars O to the intersections of the lazy-tongs bars M, and this lazy-tongs O can be distended or contracted by the action of the cord O', and the cord O' can pass around a pulley O² with a hand and dial O⁴ to indicate the rays as parallel or diverging. When the lazy-tongs is moved by the cord O' so as to bring the intersecting points and their ray-bars or cords O³ close together, then such ray-bars or cords will indicate that the rays entering the eye diverge from the object viewed to the cornea. When the lazy-tongs may be opened to correspond with the lazy-tongs M, the bars or cords O³ will then be substantially parallel and indicate that the rays of light entering the eye are parallel.

As it is usual and most convenient to have a plate of glass in front of this apparatus, the dial-hands cannot be easily turned. I have therefore prolonged the cords passing to the pulleys of the respective dials, so that the dials can be moved by cranks or wheels at the lower side of the frame. I have represented the wheel L⁴ as adapted to turn the hand at L², a wheel H⁵ to turn the hand 15, and a wheel P as connected to the hand 10 of the pulley 9 for turning such hand 10 and moving the cords therewith connected, and the wheel P' as connected to the pulley 12 for turning the hand 13 simultaneously with the adjustment of the distance between the studs 2 2, to which the illustration F of the cornea is attached, and the wheel M⁴ is connected to the pulley and hand at M² for varying the illustration of the rays entering the cornea, and at O⁶ a hand-wheel is represented, with connections to the lazy-tongs O for varying the position of the intersections of the lazy-tongs O and the proximity at this end of the ray-bars or illustrations O³.

By the apparatus before described a lecturer or instructor can give to the hearer an illustration of the movements of the various portions of the eye and the object of such movements. He can also show how difficulties of vision arise and explain the mode of treatment. He can also illustrate the manner in which the rays of light coming into the eye are properly focused or otherwise. The device hereinbefore described does not, however, fully illustrate the action of the rays of light at the pupil of the eye. I have therefore added an illustration of the iris at R and in front thereof a transparent flexible plate S to indicate the cornea, the two ends of this flexible plate being movable, so that by moving the ends toward each other the convexity may be increased or the reverse when these ends are moved away from each other, and to effect this change in the flexible transparent plate S the lazy-tongs T T' are employed, there being projections 22 passing through the background D and receiving between them the ends of the flexible plate S, and cords U, passing over the pulleys 20 to an indicating-dial 21, can be made use of to illustrate the convexity of the pupil according as such moving end of the lazy-tongs T T' are moved toward each other or away from each other, and thereby the convexity or the reverse of the transparent flexible plate S will be indicated at the dial 21, and it is also convenient to employ a hand-wheel U' at the lower side of the case or frame A and a pulley within the frame and connections, as indicated, so that the lazy-tongs may be moved to vary the convexity of the transparent plate S, that illustrates the cornea. It must be borne in mind that in order to indicate the divergence of the rays of light the middle of each lazy-tongs O M L is a fixture in a plane corresponding to the axial line of the eye-model, so that the divergence can be equal at both sides of such axial line. By this device the convexity of the cornea is illustrated, and it can be explained by this model that when there is any defect or astigmatism it may be either horizontally or vertically.

I claim as my invention—

1. In a mechanical illustrator of the eye, the combination with a background, of a flexible eyeball-outline, and means for moving the back portion of this flexible eyeball-outline to indicate the relative position of the retina to the lens, substantially as set forth.

2. In a mechanical illustrator of the eye, the combination with a background, of a flexible eyeball-outline, and means for moving the back portion of this flexible eyeball-outline to indicate the adjustment of the retina, a crystalline-lens illustration and means for varying the shape or convexity of the same, substantially as set forth.

3. In a mechanical illustrator of the eye, the combination with a background, of a flexible eyeball-outline, and means for moving the back portion of this flexible eyeball-outline to indicate the adjustment of the retina, a cornea illustration and means for varying the convexity of the same, substantially as set forth.

4. The combination with the flexible outline illustrating an eyeball, cornea and crystalline lens, of lazy-tongs connections for varying the position of the respective parts and cords therewith connected and means for moving such cords from the outside of the case holding the apparatus, substantially as set forth.

5. The combination with the flexible outline illustrating an eyeball, cornea and crystalline lens, of lazy-tongs connections for varying the position of the respective parts and cords therewith connected and means for moving such cords from the outside of the case holding the apparatus, dials and indicating-hands within the case for the respective parts, substantially as set forth.

6. The combination with a flexible outline to illustrate an eyeball, cornea and crystalline lens and means for adjusting the same, of devices illustrating rays of light and means for varying the position of such illustrative devices outside the illustration of the eyeball at the front thereof and also behind the same, substantially as set forth.

7. The combination with an illustration of an eye, of ray-bars to illustrate the lines of light, and lazy-tongs for moving the same in front of the representation of the eye, substantially as set forth.

8. The combination with an illustration of an eye, of ray-bars to illustrate the lines of light and lazy-tongs for moving the same behind the representation of the eye, substantially as set forth.

9. The combination with an illustration of an eye, of ray-bars to illustrate the lines of light, lazy-tongs for moving the same in front of the representation of the eye, cords or equivalents representing rays of light approaching the eye and lazy-tongs connections for the same illustrating the parallelism or divergence of the rays of light passing to the eye, substantially as set forth.

10. The combination with the illustration of an iris, of a transparent plate and mechanism for giving to the same greater or less convexity, and a dial for indicating the convexity of the cornea in front of the pupil, substantially as set forth.

Signed by me this 17th day of June, 1899.

H. A. HEATH.

Witnesses:
GEO. T. PINCKNEY,
HAROLD SERRELL.